(12) United States Patent
Marupaduga et al.

(10) Patent No.: US 10,624,044 B1
(45) Date of Patent: Apr. 14, 2020

(54) DYNAMIC VARIATION OF POWER SUPPLY TO A SPLIT MODE ANTENNA ARRAY

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/243,875

(22) Filed: Jan. 9, 2019

(51) Int. Cl.
*H04W 52/34* (2009.01)
*H01Q 1/24* (2006.01)
*H04W 52/20* (2009.01)
*H01Q 21/00* (2006.01)

(52) U.S. Cl.
CPC .......... *H04W 52/346* (2013.01); *H01Q 1/246* (2013.01); *H04W 52/20* (2013.01); *H01Q 21/00* (2013.01)

(58) Field of Classification Search
CPC ... H04W 16/10; H04W 72/04; H04W 52/346; H01Q 1/246

USPC ........ 455/522, 69, 452.1, 452.2, 509, 279.1, 455/277.1

See application file for complete search history.

(56) References Cited

U.S. PATENT DOCUMENTS

| | | | |
|---|---|---|---|
| 9,572,197 B1* | 2/2017 | Wurtenberger | H04W 88/08 |
| 9,769,773 B1* | 9/2017 | Park | H04W 52/365 |
| 2011/0150050 A1* | 6/2011 | Trigui | H04B 7/0617 375/219 |
| 2017/0163217 A1* | 6/2017 | Bonebright | H03F 1/0233 |

\* cited by examiner

*Primary Examiner* — John J Lee

(57) ABSTRACT

Methods and systems are provided for dynamically adjusting the power supplied to each of a first node and a second node of an antenna array. The dynamic adjustment of power is based on one or more network factors, wherein the network factors may comprise device penetration, call failures, and connection drops experience between a plurality of user devices and each of the first node and the second node. The first node may communicate with user devices using a first protocol and the second node may communicate with user devices using a second protocol wherein the first protocol and the second protocol are different.

18 Claims, 7 Drawing Sheets

DYNAMIC VARIATION OF POWER SUPPLY TO A SPLIT MODE ANTENNA ARRAY

SUMMARY

The present disclosure is directed, in part, to dynamic variance of power supply to an antenna array operating in split mode, substantially as shown in and/or described in connection with at least one of the figures, and as set forth more completely in the claims.

In aspects set forth herein, a power supply to nodes of an antenna array or a plurality of antenna elements in a node of an array may be individually and dynamically controlled in order to change the beamform of a first node and/or a second node. While typically 3D beamforming may be achieved using a variety of physical means, including actuators, motors, and wave guides, aspects herein enable 3D beamforming by dynamically controlling the power supply to any of one or more antennas of an antenna array. While conventional devices have a power supply to nodes, such as a nodeB, because the entire node is allocated to transmitting or receiving using a single protocol or single frequency/frequency band, there is no need to allocate power supplied by a common power supply to two different nodes. Conventionally, when wireless communication providers upgrade or change communication protocols, they must use additional real estate on towers or buildings to simultaneously deploy legacy and new equipment. This redundant deployment ensures continuity of coverage to users but conventionally requires a second power supply, second cabinet, second radio, etc. However, here, a single antenna array or antenna system may comprise two nodes supplied by a common power supply, the power supply dynamically supplying power to the two nodes or elements of the two nodes based on certain factors that improves the ability of the single array to simultaneously provide service across different protocols.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
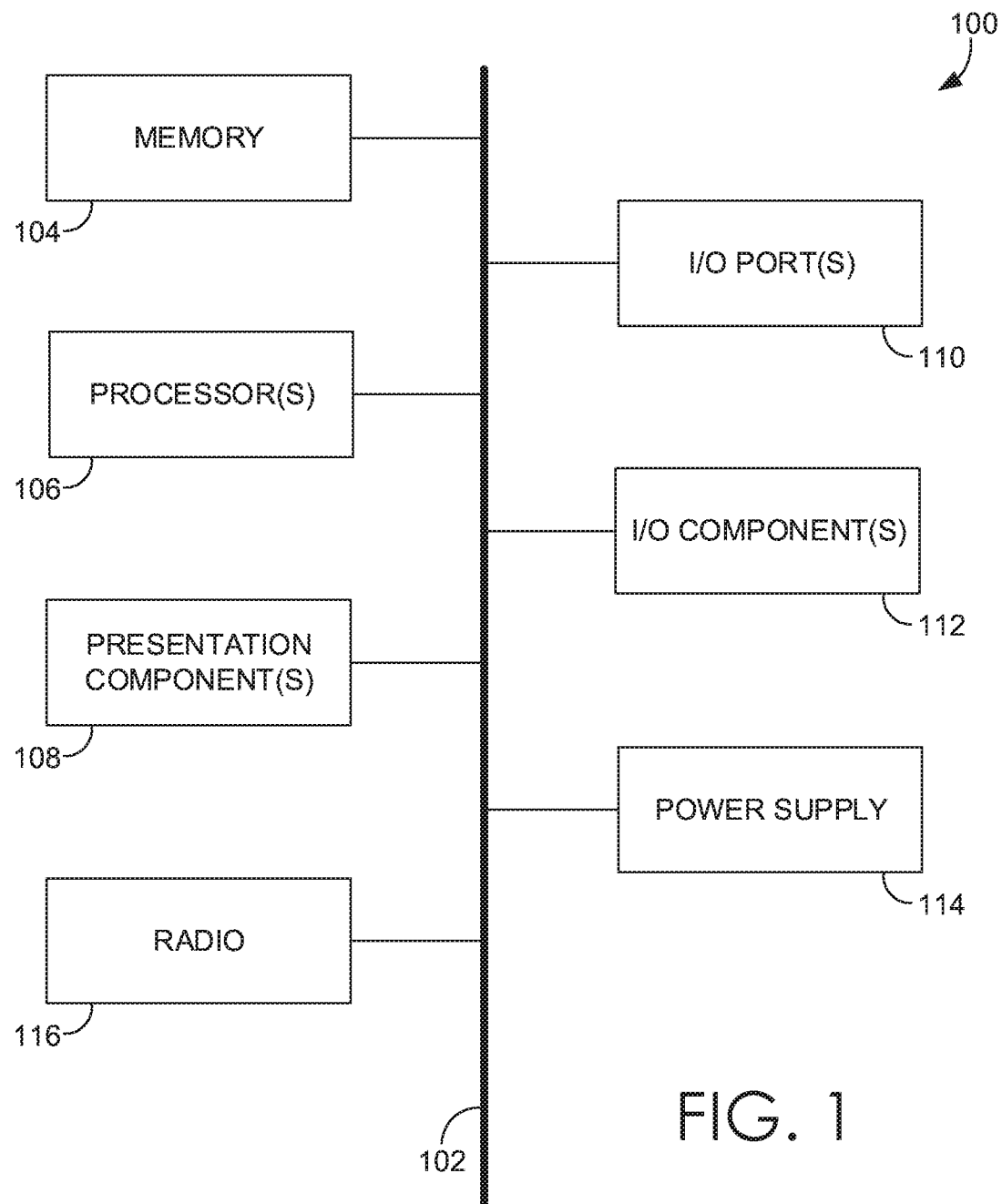
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
gNodeB Next Generation Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
NR New Radio
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, 31 Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (e.g., cell sites, cell towers) to provide network coverage. The base stations are employed to broadcast and transmit transmissions to user devices of the telecommunications network. Many factors can affect the exchange of wireless signals between a base station and a UE. Those factors relevantly include the protocol used to communicate, the carrier band frequency, and the output power of transmitted signals. In particular, the power supplied to a base station or the nodes of a base station are positively correlated with increased throughput as a higher signal strength improves SINR and channel quality. However, power supplies to a node are limited by equipment specifications, often limited to no more than 160 W total output power.

Generally, antenna arrays located at a base station, transmit or receive signals according to a single protocol. An example of this is a 4G base station that uses one or more eNodeBs to wirelessly communicate with user equipment (UE) according to the 4G protocol. In another example, a 5G base station may use one or more gNodeBs to wirelessly communicate with user equipment according to the 5G standard. The development and deployment of 5G presents a variety of technical problems. One of the problems is that a significant number of current and legacy devices are capable of wirelessly communicating with a telecommunications network using 4G but are not technically capable of communicating using 5G. Compounding this problem, many 5G base stations are not capable of backward compatibility with 4G, that is, a 5G base station may not transmit or receive according to the 4G protocol. These pair of technical problems mean that in order to transition from a 4G network to a 5G network, wireless communication carriers may be required to deploy both 4G and 5G base stations, increasing network complexity, increasing total power consumption, and requiring approximately twice as much real estate (requiring expensive leases and time-consuming and expensive installations).

A split mode antenna array operating at a base station, on the other hand, is capable of simultaneously communicating using two different communication protocols. By dividing the antenna array into a first node and second node and supplying the nodes with a common power supply, the base station can wirelessly communicate with devices according to both protocols without increasing overall power consumption and reducing the need for additional equipment on costly real estate. As throughput and connectivity are positively correlated with power output, the split mode antenna array can control throughput and connectivity on each protocol by allocating power between the two nodes.

Accordingly, in a first aspect of the present disclosure, an embodiment is directed to a system for dynamic power allocation of an antenna array. The system may comprise an antenna array comprising a first node and a second node, a first power amplifier coupled to a first antenna element of the first node, a second power amplifier coupled to a second antenna element of the second node, and a processor. The first power amplifier provides a first power supply to the first antenna element and the second power amplifier provides a second power supply to the second antenna element. The processor may be configured to execute operations comprising determining, based on at least one factor, that at least one of the first power supply and the second power supply should be modified, and modifying at least one of the first power supply and the second power supply in response to the determination.

In a second aspect of the present disclosure, an embodiment is directed to a method for dynamically allocating power in an antenna system. The method comprises determining a maximum supply power available to the antenna system by a power supply component, wherein the antenna system comprises a first node and a second node, and wherein the first node and second node comprise a plurality of antenna elements, determining a current power to each antenna element within the plurality of antenna elements of the first node and the plurality of antenna elements of the second node, determining, based on at least one factor, that the current power supplied to the plurality of antenna elements of at least the first node should be modified, and dynamically modifying the power supplied to the plurality of antenna elements of at least the first node, wherein a total power supplied to the first node and the second node do not exceed the maximum supply power available to the antenna system.

In another aspect, an embodiment of the present disclosure is directed to a system for dynamic power allocation of an antenna array. The system comprises an antenna system comprising a first node and a second node, wherein each of the first node and the second node comprise a plurality of antenna elements. The system also comprises a first power supply coupled to the first node and providing a first power level and a second power supply coupled to the second node, providing a second power level. The system additionally comprises a processor configured to execute operations comprising determining, based on at least one factor, that at least one of the first power level or the second power level should be modified, and modifying at least the first power level via at least the first power supply.

In yet another aspect of the present disclosure, an embodiment is directed to a non-transitory computer storage media storing computer-usable instructions that, when used by one or more processors cause the one or more processors to determine a maximum supply power available to the antenna system by a power supply component, wherein the antenna system comprises a first node and a second node, and wherein the first node and second node comprise a plurality of antenna elements, determine a current power to each antenna element within the plurality of antenna elements of the first node and the plurality of antenna elements of the second node, determine, based on at least one factor, that the current power supplied to the plurality of antenna elements of at least the first node should be modified, and cause the modification of the power supplied to the plurality of antenna elements of at least the first node, wherein a total power supplied to the first node and the second node do not exceed the maximum supply power available to the antenna system.

As employed herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station. A UE may be, in an embodiment, similar to device 100 described herein with respect to FIG. 1.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100.

Illustrative I/O components 112 include a microphone, joystick, game pad, satellite dish, scanner, printer, wireless device, etc.

Radio 116 represents a radio that facilitates communication with a wireless telecommunications network. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
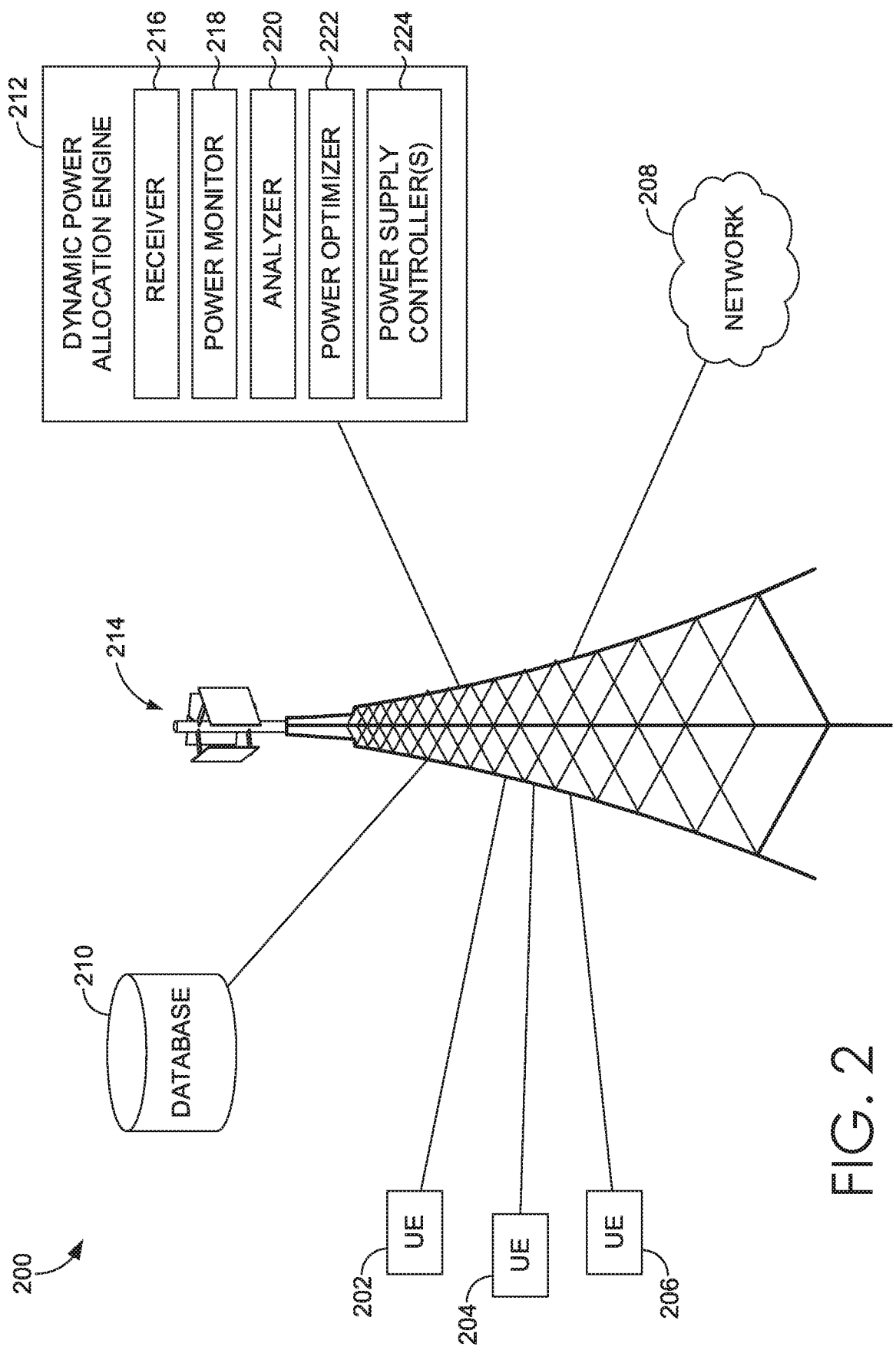
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user devices (items 202, 204, and 206), cell site 214, network 208, database 210, and dynamic power allocation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 202, 204, and 206) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 202, 204, and 206) in network environment 200 can optionally utilize network 208 to communicate with other computing devices (e.g., a mobile device(s), a server(s), a personal computer(s), etc.) through cell site 214 using any one of a plurality of protocols, such as 3G, 4G/LTE, 5G and other related protocols. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., 5G and LTE) to user devices, such as user devices 202, 204, and 206. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, cell site 214 is configured to communicate with user devices, such as user devices 202, 204, and 206 that are located within the geographical area, or cell, covered by radio antennas of cell site 214. Cell site 214 may include one or more base stations, base transmitter stations, radios, antennas, antenna arrays, power amplifiers, transmitters/receivers, digital signal processors, control electronics, GPS equipment, and the like. In particular, the cell site 214 of the present disclosure may communicate with at least one user device, such as a first user device 202 via a first protocol (e.g., 4G) and simultaneously or nearly simultaneously communicate with a second user device 204 vis a second protocol (e.g., 5G).

As shown, cell site 214 is in communication with dynamic power allocation engine 212, which comprises various components that are utilized, in various implementations, to perform one or more methods for dynamically allocating power between two nodes, wherein each node wirelessly communicates with one or more user devices using a distinct protocol. In some implementations, dynamic beamforming engine 212 comprises components including a receiver 216, a power monitor 218, an analyzer 220, a power optimizer 222, and one or more power supply controllers 224. However, in other implementations, more or less components than those shown in FIG. 2 may be utilized to carry out aspects of the invention described herein. Each of the components or sub components of the dynamic power allocation engine 212 may be a stand-alone or combined processor, server, or other computer processing component that is suitably configured to perform the operations described herein.

The receiver 216 of the dynamic power allocation engine 212 is generally responsible for receiving information from user devices that is relevant to making a power allocation determinations. The receiver 216 may receive one or more uplink signals, such as a sounding reference signal, from each of a plurality of user devices. In aspects, the one or more uplink signals may provide information to the power allocation engine 212 comprising a location of the user device, such as an absolute position (e.g., latitude and longitude as determined by triangulation, GPS, or any other similar means), or a relative position (e.g., a range or distance between the cell site 214 and the transmitting user device. The one or more uplink signals may also comprise information relating to call or channel quality. Said information may comprise information regarding call failures, call drops, SINR, RSRP, or the like. The receiver 216 may compile and/or decode the information received from the one or more user devices and provide user device location information and/or call or channel quality information to any one or more other components of the dynamic power allocation engine 212. In an exemplary use case, the receiver 216 may receive one or more uplink signals from the first user device 202 comprising a GPS-based absolute position, information indicating the communication protocol capabilities of the first user device 202, and call or channel quality information.

The power monitor 218 of the dynamic power allocation engine 212 is generally responsible for monitoring the power output of the antenna array at the cell site 214. The power monitor may be communicatively coupled to any one or more components of the cell site in order to determine how much power is presently supplied (or maximally supplied) to the antenna array, each of the one or more nodes, and/or to each individual antenna element. For example, the power monitor 218 may determine that a single radio supplying power to a single antenna array is presently supplying 160 W to the antenna array, which is the maximum capable by the radio. The power monitor 218 may further determine that 120 W are presently supplied to a first node of the antenna array and that 40 W are presently supplied to a second node of the antenna array. The power monitor 218 may also determine that 1.2 W are being supplied to each of 32 transmit elements of the second node. In aspects, the power monitor 218 may be communicatively coupled via a hardwire/physical link or via a wireless connection, such as Bluetooth, NFC, 802.11, or any other suitable wireless link. The power monitor may associate the amount of power presently supplied (or maximally supplied) with the monitored radio/node/element and pass the information to any one or more other components of the dynamic power allocation engine 212, such as the analyzer 220.

The analyzer 220 is generally responsible for making power allocation determinations based on present network conditions, maximum available output power, and any one or more factors. The analyzer 220 may receive user device location and call or channel quality information from the one or more user devices and determine any one or more power allocation factors, comprising any one or more of device penetration, call failure rate, and connection drop rate (per protocol). As used herein, device penetration means the number of user devices connected to or served by a first node of the antenna array, wherein the first node uses a first wireless communication protocol (e.g., 3G, 4G/LTE, 5G) to communicate with any one or more user devices. Call failure rate may be a proportion, percentage, or simple number of call failures experienced by any one or more user devices in an attempt to connect to the first node of the antenna array, wherein the term "call failure" is used herein to mean an unsuccessful attempt by a user device to initiate a wireless communication session with the network or another user device. The dropped call factor may also be a rate, proportion, percentage, or simple number of connection drops experienced by any one or more user devices in communication with the first node, wherein the term "connection drop" is used herein to describe the undesirable termination of a previously-established wireless communication session. Though the terms "call failure" and "connection drop" may suggest application to voice calls, the terms, as used herein, are also used to describe data or other non-voice communication sessions. Both the call failure and connection drop factors may be said to occur within some time period, such as 5 minutes, an hour, several hours, one day, or several days, or at any other periodicity.

The analyzer 220 may compare said information to the power presently and/or maximally supplied to the various hardware components, as determined by the power monitor 218. In a non-limiting example, the analyzer 220 may receive information from the power monitor 218 that a first node of the antenna array is configured to communicate via a first protocol and is presently supplied with 80 W, and that a second node of the antenna array is configured to communicate via a second protocol and is also presently supplied with 80 W. The analyzer 220 may further receive information from the receiver 216 that 75% of user devices presently served by the antenna array are communicating with the cell site 214 via the first protocol and only 25% of the user devices presently served by the antenna array are communicating with the cell site 214 via the second protocol. Further, user devices communicating with the first node via the first protocol may have a much higher call failure rate (e.g., 3% vs. 0.5%) than user devices communicating with the second node via the second protocol, and the connection drop rate may be approximately equal. Based on any one or more of these factors, the analyzer 220 may determine that the power to the first node should be increased and, since the total supply power was already at its maximum, that the power to the second node should be decreased. The analyzer 220 may provide said determination to the power optimizer 222.

The power optimizer 222 may be generally configured to determine how much power should be supplied to each of the first node and the second node of the antenna array based on the one or more determinations made by the analyzer 220. The power optimizer 222 may continually determine how much power should be supplied to each of the first node and the second node and provide instructions to the power supply controllers 224, it may make said determination at some frequency (e.g., every 5 minutes, 15 minutes, one hour, one day, or the like), or it may make said determination upon the analyzer determining that one or more of the factors have exceeded a threshold (e.g., the call failure rate for one of the first node or the second node exceeds an operator-set threshold, such as 1%, 3%, 5%, or the like). In some aspects, the dynamic power allocate engine 212 may use an iterative process to dynamically allocate the power to the antenna elements or nodes of the antenna array. That is, upon the analyzer 220 determining that the power supplied to the first node or the second node should be modified, the power optimizer 222 may determine, based on the degree of difference between the factors on each protocol, a stepped power change. For example, assuming that call failures and connection drop rates were approximately the same for each of the first node and the second node but device penetration was determined to be 45% using the first protocol and 55% using the second protocol (10% difference), the power optimizer may increase power to the second node by 5 W and decrease the power to the first node by 5 W, since the difference in device penetration was less than 25%. In contrast, if 80% of user devices served by the cell site 214 were using the first protocol and 20% were using the second protocol, the power optimizer may increase the power to the first node by 10 W and decrease the power to the second node by 10 W, since the difference in the device penetration factor was more than 25%. In both cases, the stepped allocation process would repeat to determine if the previous power optimization/allocation was sufficient to achieve the operator-desired balance of factors between the two protocols. In other aspects, the power optimization may be ratio-based. That is, in the last example, the power optimizer 222 may determine that 80% of the total available supply power be supplied to the first node and 20% of the total available supply power be supplied to the second node (e.g., in a 160 W-max system, 128 W to the first node and 32 W to the second node). Those skilled in the art would recognize that there are numerous ways to implement power optimization consistent with the present disclosure. Regardless of the basis of the power optimizing determination, the power optimizer 222 may output power supply instructions to the one or more power supply controllers 224 (e.g., supply the first node with 128 W and supply the second node with 32 W, or increase the first node supply power by an amount and decrease the second node supply power by the amount).

The power supply controller 224 is generally responsible for adjusting the one or more power supplies as determined by the power optimizer. The power supply controller 224 may modify the phase and/or the amplitude of the power supply to any one or more nodes or antenna elements of the antenna array of the cell site 214. In aspects, the one or more power supply controllers 224 may be a radio, remote radio head, integrated radio, power amplifier, or the like.

Figure 3A:
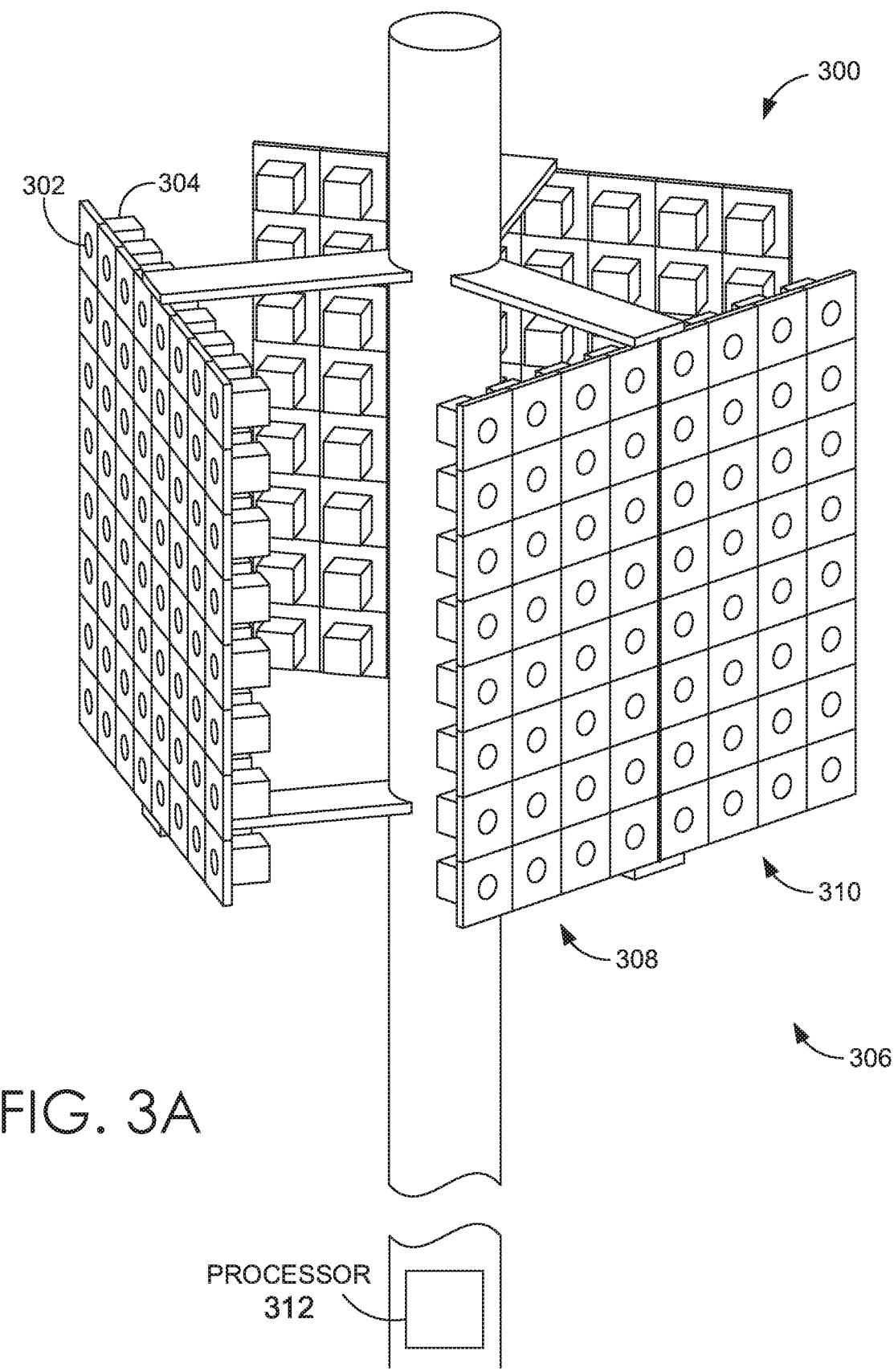
FIGS. 3A-3B each depict a graphical representation of base station configurations suitable for use in embodiments of the present disclosure.

Turning now to FIG. 3A, an exemplary base station configuration suitable for use in implementing embodiments of the present disclosure is illustrated and designated generally as base station 300. Base station 300 is but one example of a suitable configuration and is not intended to suggest any limitations as to the scope of use or functionality of embodiments described herein. Neither should the configuration be interpreted as having any dependency or requirement relating to any one or combination of components illustrated.

Base station 300 comprises at least a first antenna array 306, the first antenna array 306 having one or more antennas 302. In aspects, the one or more antennas 302 may be dipole antennas, having a length, for example, of ¼, ½, 1, or 1½ wavelength. In aspects, the antenna array may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz-30 GHz.

By way of a non-limiting example, the antenna array 306 may comprise 64 antennas 302 arranged in an 8×8 structure. In other aspects, the antenna array 306 may comprise antennas arranged in an 8×4, 4×8, or 4×4 configuration. Each antenna 302 of the first antenna array 306 comprises a dedicated power supply 304. The power supply 304 supplies power having a certain phase and amplitude to antenna 302. In an embodiment, the power supply comprises a power amplifier. In other aspects, the power supply may additionally comprise a processor for making power supply determinations based on any one or more factors, consistent with this disclosure. Each power supply 304 may have a maximum power supply to each antenna 302, wherein the power supply 304 cannot supply more than a certain amount of power to the antenna 302. In aspects, the maximum per-antenna supply power may be 2.5 W, 3.5 W, 4 W, 5 W, or more.

In aspects, the first antenna array 306 may comprise a first node 308 and a second node 310. The first node 308 and the second node 310 may each communicate with one or more user devices according to a distinct protocol (i.e., the first node is configured to communicate with UE according to a first wireless communication protocol and the second node is configured to communicate with UE according to a second wireless communication protocol). By way of non-limiting example, each of the first protocol and the second protocol may comprise 3G, 4G, LTE, 5G, 802.11, or any other operator-elected wireless communication protocol standard.

The base station 300 may further comprise a processor 312. The processor 312 may be any one or more processors, servers, computer processing components, or the like, wherein the processor 312 is configured to perform any one or more operations of the dynamic power allocation engine 212 of FIG. 2. In some aspects, the processor 312 may be communicatively coupled to each of the first node 308 and the second node 310, and/or to each antenna 302 of the first node 308 and the second node 310. As discussed with respect to the dynamic power allocation engine 212 of FIG. 2, the processor 312 of FIG. 3A may make power control/allocation decisions based on any one or more factors comprising device penetration, call failures, and connection drops.

Figure 3B:
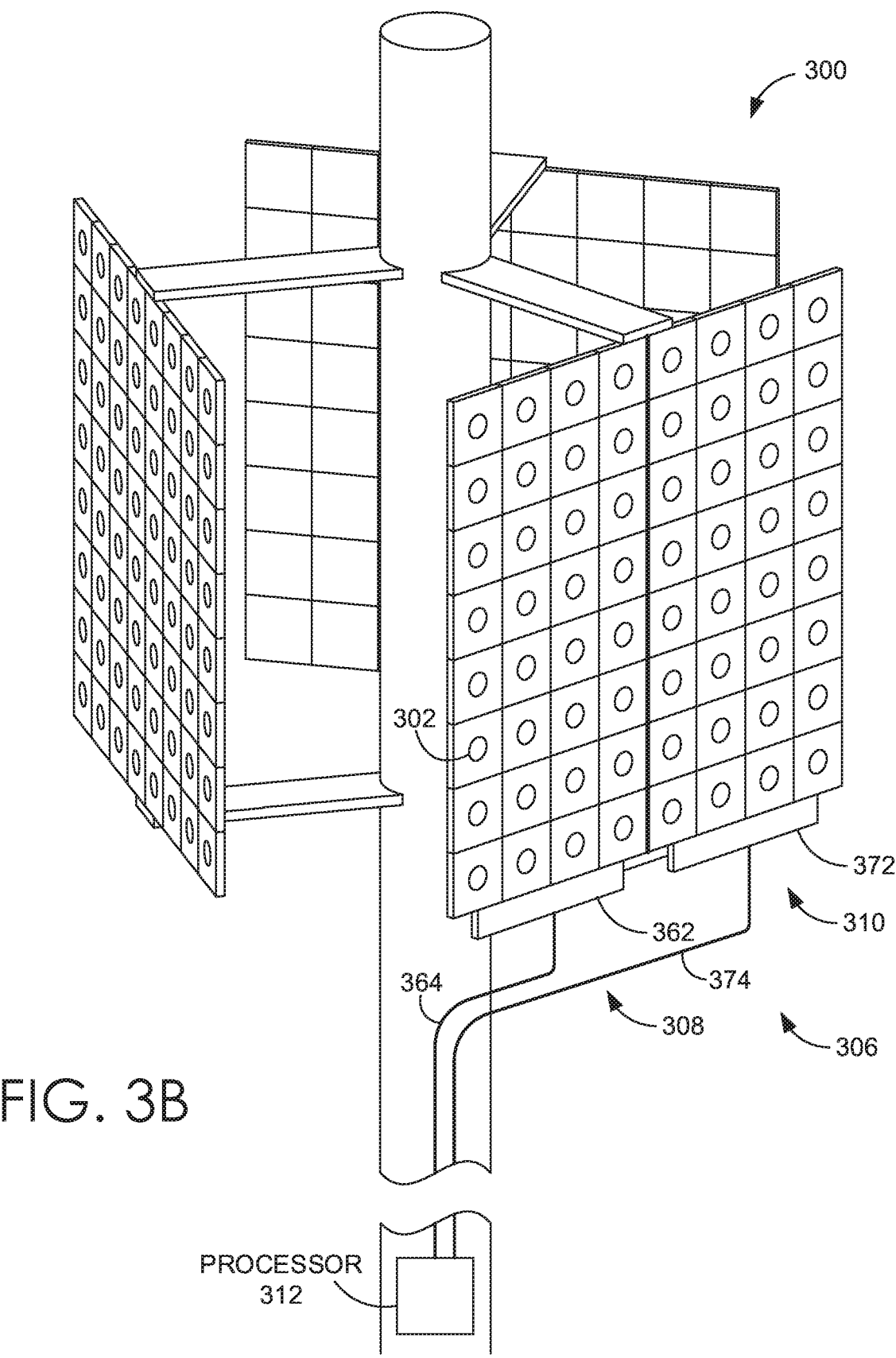

Turning now to FIG. 3B, an alternative embodiment of the base station 300 is illustrated. In aspects, instead of, or in addition to, a power supply 304 being dedicated to each antenna element 302, the first node 308 may be supplied with a first node power controller 362 and the second node 310 may be supplied with a second power controller 372. In such aspects, each of the first node power controller 362 and the second node power controller 372 may control the flow of power to each antenna element 302 or to the plurality of power supplies 304. In some aspects, the first node power controller 362 may be connected to the processor 312 via a first connection 364 and the second node power controller 372 may be connected to the processor via a second connection 372. In such aspects, the processor may comprise a radio and use each of the first connection 364 and the second connection 374 to supply power to the first node power controller 362 and the second node power controller 372, respectively.

Figure 4A:
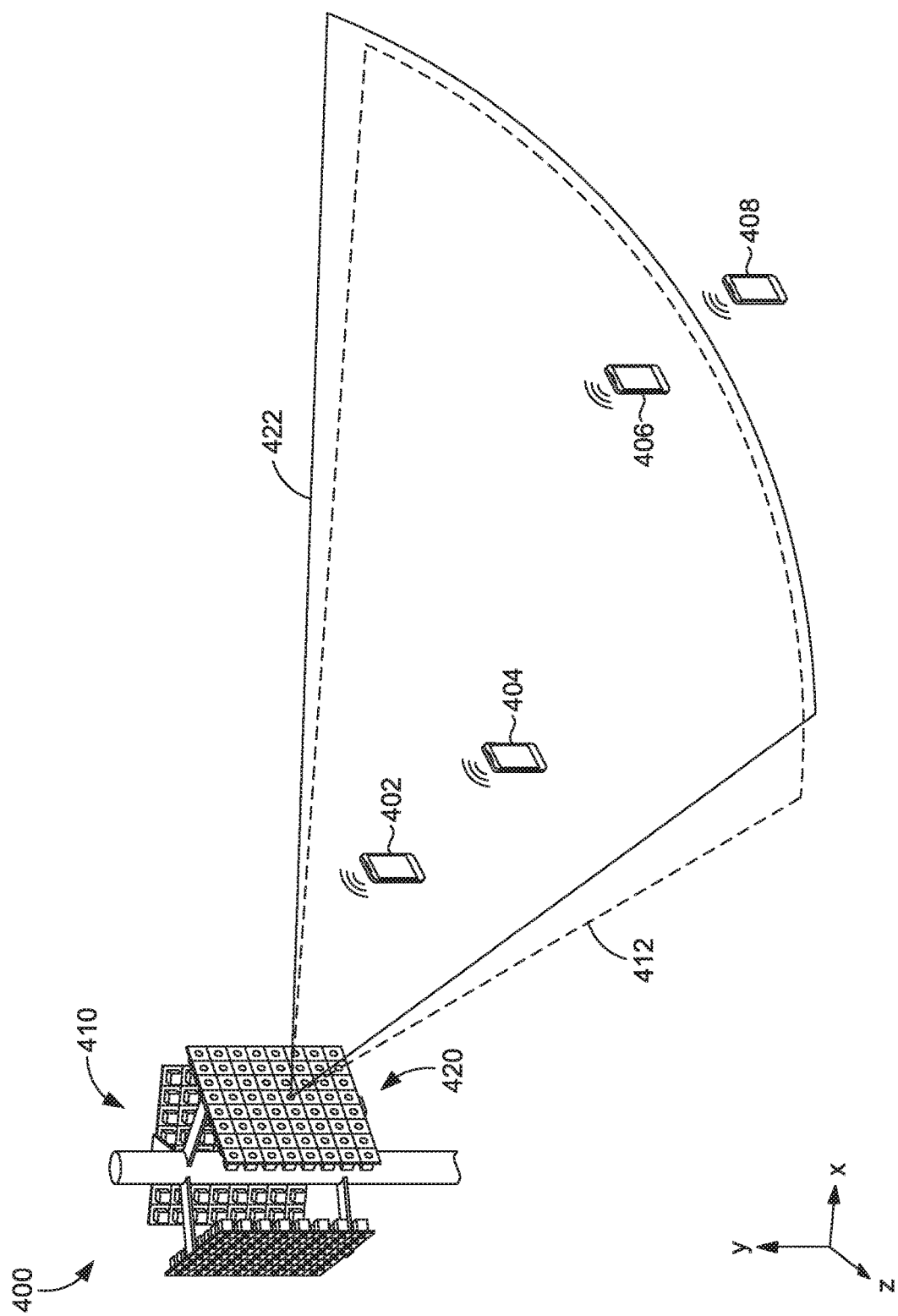
FIG. 4A-4B depicts a coverage footprint of a beamform produced by two nodes of a single antenna array in accordance with aspects herein.
Figure 4B:
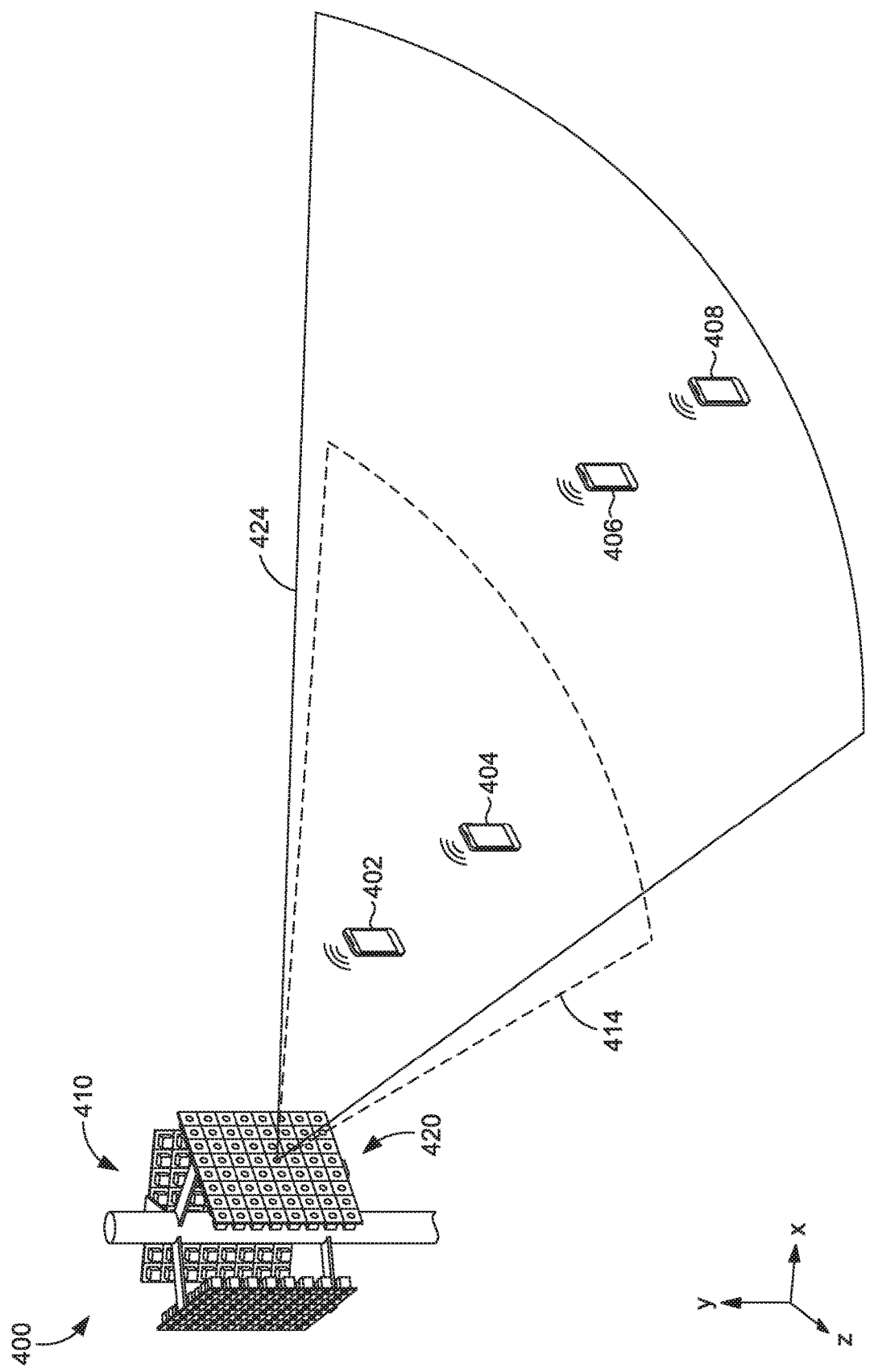

Turning now to FIGS. 4A-4B, a system 400 comprises a base station 410 that serves a plurality of user devices with wireless communication services. The base station 410 may comprise an antenna array 420, which may further comprise a first node in a second node. Each of the first node and the second node may transmit one or more wireless signals according to a discrete wireless communication protocol. That is the first node may communicate with one or more user devices according to a first protocol and the second node may communicate with one or more user devices according to a second protocol, wherein the first protocol and the second protocol are different. The one or more wireless signals emitted by the first node may be said to create a first node coverage footprint 412. The one or more wireless signals emitted by the second node may be said to create a second node coverage footprint 422. In aspects, the first node and the second node may at least partially serve a common sector (i.e., the first node coverage footprint and the second node coverage footprint may at least partially overlap and make up a portion of an area served by the base station 410).

As seen in FIG. 4A, the system 400 may comprise a plurality of user devices. Each of the plurality of user devices may be configured to wirelessly communicate with either the first node according to the first protocol or with the second node according to the second protocol. For example, each of a first user device 402, a third user device 406, and a fourth user device 408 may communicate, or attempt to communicate, with the first node according to the first protocol. A second user device 404 may communicate or tempt to communicate with the second node according to the second protocol. As illustrated by FIG. 4A, the fourth user device 408 lies beyond the first node coverage footprint 412. Because of this, the fourth user device 408 may experience a call failure (e.g., a failed connection due to a poor SINR, low RSRP, or the like). As can also be seen, the number of user devices communicating with the base station 410 according to the first protocol significantly exceeds the number of devices communicating with the base station 410 according to the second protocol. In this example, connection drops may be approximately equal between the first node and the second node. Because the system 400 may comprise or perform one or more functions of the dynamic power allocation engine 212 of FIG. 2, the system 400 may be aware of the absolute and/or relative locations of each of the first, second, third, and fourth user devices. Thus, it may be determined that one or more network factors, in combination with the known location of the user devices, favor a modification of the power supplied to each of the first node and the second node, wherein the network factors comprise any one or more of device penetration, call failures, and connection drops.

Turning now to FIG. 4B, the system 400 depicts how the first node coverage footprint 412 may be adjusted to become a modified first node coverage footprint 414, and how the second node coverage footprint 422 may be adjusted to become a modified second node coverage footprint 424. As can be seen, by increasing the power supplied to the second node, the modified second node coverage footprint 424 extends further from the base station 410 then the first node coverage footprint 422. As a result, the fourth user device 408 may not experience a call failure because of an improved SINR and/or RSRP. Further, because the second user device 404 still lies well within the modified second node coverage footprint 414, the four user devices experience an overall increase in throughput and connectivity after the dynamic power allocation.

Figure 5:
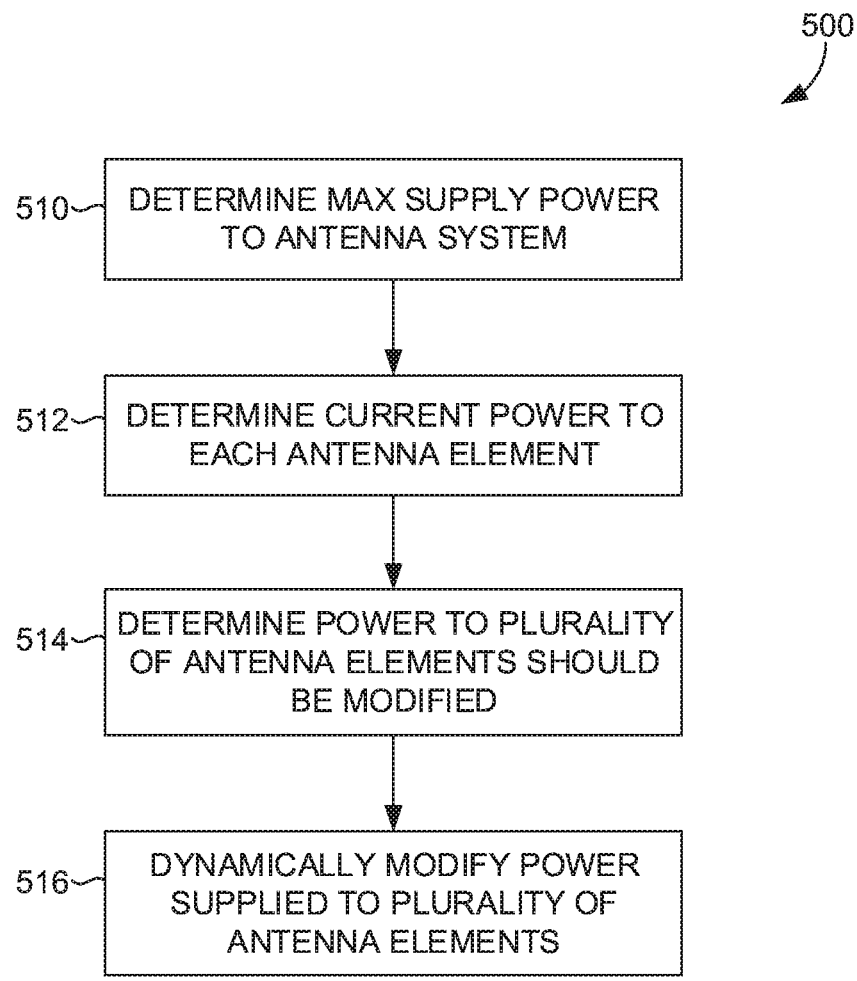
FIG. 5 depicts a flow diagram of an exemplary method for dynamically varying a common power supply to two nodes of a single antenna array to adjust the beamform of the two nodes, in accordance with implementations of the present disclosure.

Turning now to FIG. 5, a flow diagram is illustrated of an exemplary method 500 for dynamically varying one or more power supplies to an antenna system based on at least one factor, in accordance with implementations of the present disclosure.

Initially at block 510, a maximum power supply to an antenna system is determined. As described above, the antenna system may comprise an antenna array having at least two nodes, wherein the maximum power supply to the antenna system is the maximum aggregate power supply to every node of the antenna system. In aspects, the maximum power supply to the antenna system is determined by determining the technical and/or hardware characteristics of one or more power supply components and antenna elements or nodes of the antenna system. For example, a power supply component may be technically capable of a total output power of 160 W but the total combined maximum power of the nodes and/or the antenna elements of the antenna system may be limited to 150 W. In some aspects the maximum power supply to an antenna system may be 120 W, 160 W, or 200 W.

At block 512, a current power to each antenna element and/or each node of the antenna system is determined. In some aspects, it may be determined that a first amount of power is being supplied to a first node and a second amount of power is being supplied to a second node. The first amount of power being supplied to the first node may be equally divided amongst the antenna elements of the first node, or if the first amount of power being supplied to the first node is not equally divided amongst antenna elements of the first node, it may be determined how much power is supplied to each of the one or more antenna elements of the first node. In addition to determining how much power is supplied to each of the one or more antenna elements or the first or second nodes, a first current coverage footprint for the first node and a second current coverage footprint for the second node may be determined.

At block 514, is determined that the power to a plurality of antenna elements should be modified. In aspects, the plurality of antenna elements may comprise antenna elements of only the first node, only the second node, or antenna elements of both the first node and the second node. The determination to modify the power to the plurality of antenna elements is based on any one or more operator defined network factors. In some aspects, the network factors may comprise device penetration, call failures, and connection drops. Additional information such as the location of the plurality of connected user devices served by the antenna system and the communication protocol used to communicate between each user device and the first node or the second node may be collected and used in this determination. If it is determined that the first node is experiencing worse one or more network factors than the second node, power may be increased to the first node and decreased from the second node.

At block 516, the power supplied to the plurality of antenna elements is dynamically modified. Based on the determinations of blocks 510, 512, and 514, the antenna system or components thereof may be instructed to modify the power supplied to the first node, the second node, and/or a plurality of antenna elements of the first node and/or the second node. By modifying the power supplied to the first node, the second node, and/or the plurality of antenna elements of the first node and/or the second node, the first coverage footprint and the second coverage footprint will change. Because the first node and the second node serve at least some of a common sector, the first coverage footprint and the second coverage footprint, both before and after the power modification, may at least partially overlap. The dynamic modification of power supplied to the plurality of antenna elements may be achieved by adjusting the power supplied to one or more dedicated power amplifiers wherein each of the one or more dedicated power amplifiers supplies power to a single antenna element of the antenna system. In other aspects, the dynamic modification of power supplied to the plurality of antenna elements may be an instruction to the one or more dedicated power amplifiers for the dedicated power amplifier to control the power supplied to the corresponding antenna element. Each of the one or more dedicated power amplifiers may take the form of a radio, a remote radio head, an integrated antenna radio head, or a conventional antenna power amplifier.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamic power allocation of an antenna array, the system comprising:
   the antenna array comprising a first node and a second node;
   a first power amplifier coupled to a first antenna element of the first node, the first power amplifier providing a first power supply to the first antenna element;
   a second power amplifier coupled to a second antenna element of the second node, the second power amplifier providing a second power supply to the second antenna element; and
   a processor configured to execute operations comprising:
   determining, based on at least one factor, that at least one of the first power supply and the second power supply should be modified, wherein the at least one factor comprises one or more of:
      a device penetration, wherein the device penetration is determined by a first quantity of devices served by the first node and a second quantity of devices served by the second node;
      a call failure rate, wherein the call failure rate is determined by a ratio of failed calls to completed calls for each of the first node and the second node; and
      a connection drop rate, wherein the connection drop rate is the total number of dropped calls within an interval of time; and
   modifying at least one of the first power supply and the second power supply.

2. The system of claim 1, wherein the first node comprises thirty two antenna elements.

3. The system of claim 1, wherein the first node is a gNodeB.

4. The system of claim 3, wherein second node is an eNodeB.

5. The system of claim 1, wherein the first node and the second node serve the same sector.

6. A method for dynamically allocating power in an antenna system, the method comprising:
   determining a maximum supply power available to the antenna system by a power supply component, wherein the antenna system comprises a first node and a second node, and wherein the first node and second node comprise a plurality of antenna elements;
   determining a current power to each antenna element within the plurality of antenna elements of the first node and the plurality of antenna elements of the second node;
   determining, based on at least one factor, that the current power supplied to the plurality of antenna elements of at least the first node should be modified; and
   dynamically modifying the power supplied to the plurality of antenna elements of at least the first node, wherein a total power supplied to the first node and the second node does not exceed the maximum supply power available to the antenna system.

7. The method of claim 6, wherein the at least one factor comprises device penetration, wherein the device penetration is determined by a first quantity of devices served by the first node and a second quantity of devices served by the second node.

8. The method of claim 6, wherein the at least one factor comprises a call failure rate, wherein the call failure rate is determined by a ratio of failed calls to completed calls for each of the first node and the second node.

9. The method of claim 6, wherein the at least one factor comprises a connection drop rate, wherein the connection drop rate is the total number of dropped calls within an interval of time.

10. The method of claim 6, wherein determining that the current power supplied to the plurality of antenna elements of at least the first node should be modified is based on three factors, wherein the three factors include device penetration, a call failure rate, and a connection drop rate.

11. The method of claim 6, wherein the antenna system further comprises a third node comprising a plurality of antenna elements, and wherein the method further comprises:
   determining, based on at least one factor, that the current power supplied to the plurality of antenna elements of the second node and the third node should be modified; and
   dynamically modifying the power supplied to the plurality of antenna elements of the second node and the third node, wherein a total power supplied to the first node, the second node, and the third node, does not exceed the maximum supply power available to the antenna system.

12. The method of claim 6, the method further comprising:
   providing, by the first node, a coverage having a first footprint; and
   providing, by the second node, a coverage having a second footprint, wherein the second footprint partially overlaps the first footprint.

13. The method of claim 6, wherein the antenna system is an antenna array.

14. The method of claim 6, wherein the power supply component is an integrated antenna radio head.

15. The method of claim 6, wherein the power supply component is a power amplifier.

16. The method of claim 6, wherein the maximum supply power available to the antenna system is 160 watts.

17. A system for dynamic power allocation of an antenna array, the system comprising:
   an antenna system comprising a first node and a second node, wherein each of the first node and the second node comprise a plurality of antenna elements;
   a first power supply coupled to the first node and providing a first power level;
   a second power supply coupled to the second node and providing a second power level; and
   a processor configured to execute operations comprising:
   determining, based on at least one factor, that at least one of the first power level or the second power level should be modified, wherein the determining is based on at least one factor, wherein the at least one factor comprises device penetration, a call failure rate, or a connection drop rate; and
   modifying at least the first power level via at least the first power supply.

18. The system of claim 17, wherein the first power level is the same as the second power level.

* * * * *